United States Patent
Tsirkin et al.

(10) Patent No.: US 11,169,837 B2
(45) Date of Patent: Nov. 9, 2021

(54) FAST THREAD EXECUTION TRANSITION

(71) Applicant: Red Hat, Inc., Raleigh, NC (US)

(72) Inventors: Michael Tsirkin, Westford, MA (US); Andrea Arcangeli, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 247 days.

(21) Appl. No.: 16/549,702

(22) Filed: Aug. 23, 2019

(65) Prior Publication Data

US 2021/0055948 A1    Feb. 25, 2021

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,076,637 B2* | 7/2006 | Kelley | G06F 9/4812 712/43 |
| 7,418,584 B1* | 8/2008 | Klaiber | G06F 9/45533 712/229 |
| 8,028,184 B2* | 9/2011 | Sekiguchi | G06F 9/45558 713/323 |
| 8,281,304 B2* | 10/2012 | Kimura | G06F 11/2038 718/1 |
| 9,304,874 B2* | 4/2016 | Tsirkin | G06F 11/1484 |
| 9,483,360 B1* | 11/2016 | Tsirkin | G06F 9/45558 |
| 9,715,403 B2* | 7/2017 | van Riel | G06F 9/461 |
| 9,778,943 B2* | 10/2017 | Tsirkin | G06F 9/485 |
| 10,033,759 B1* | 7/2018 | Kabra | G06F 9/45558 |
| 10,496,425 B2* | 12/2019 | Tsirkin | G06F 21/6209 |

OTHER PUBLICATIONS

Anastopoulos et al. "Facilitating Efficient Synchronization of Asymmetric Threads on Hyper-Threaded Processors", 2008 IEEE, pp. 1-8.*

(Continued)

*Primary Examiner* — Van H Nguyen
(74) *Attorney, Agent, or Firm* — K&L Gates LLP

(57) ABSTRACT

Systems and methods for thread execution transition are disclosed. An example system includes a memory and a processor with first and second registers. An application and a supervisor are configured to execute on the processor, which suspends execution of a first thread executing the supervisor. One execution state of the first thread is stored in the first register. The application stores a request in a first shared memory location. The application executes on a second thread and another execution state of the second thread is stored in the second register. The processor suspends execution of the second thread and resumes execution of the first thread. The supervisor retrieves data for the request from the first shared memory location, and processes the data, including storing a result to a second shared memory location. The processor suspends execution of the first thread and resumes execution of the second thread.

18 Claims, 8 Drawing Sheets

(56) References Cited

OTHER PUBLICATIONS

Markovic et al. "Kernel-to-User-Mode Transitionaware Hardware Scheduling", 2015 IEEE, pp. 37-47.*

Oh et al. "Hyper Threading-aware Virtual Machine Migration", 2014 IEEE, 2 pages.*

Nadav Amit and Michael Wei, VMware Research, "The Design and Implementation of Hyperupcalls," included in the Proceedings of the 2018 USENIX Annual Technical Conference (USENIX ATC '18). Jul. 11-13, 2018, Boston, MA, USA. 16 pages. https://www.usenix.org/system/files/conference/atc18/atc18-amit.pdf.

Kenichi Yasukata et al., "HyperNF: Building a High Performance, High Utilization and Fair NFV Platform," Proceedings of SoCC '17, Santa Clara, CA, USA, Sep. 24-27, 2017, 14 pages. http://sysml.neclab.eu/projects/hypernf/hypernf.pdf.

* cited by examiner

FAST THREAD EXECUTION TRANSITION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. Virtual machines may accordingly execute multiple threads, and hardware processors may also execute multiple threads (e.g., hyper-threads).

SUMMARY

The present disclosure provides new and innovative methods and systems for execution privilege mode transition between threads. An example system includes a memory and a processor with a first register and a second register. An application and a supervisor are configured to execute on the processor, which suspends execution of a first thread executing the supervisor. A first execution state of the first thread is stored in the first register. The application stores a request in a first shared memory location in the memory. The application executes on a second thread and a second execution state of the second thread is stored in the second register. The processor suspends execution of the second thread and resumes execution of the first thread. The supervisor retrieves data associated with the request from the first shared memory location, and processes the data, which includes storing a result to a second shared memory location. Responsive to completing processing of the data, the processor suspends execution of the first thread and resumes execution of the second thread.

In another example, a non-transitory computer readable medium stores instructions which, when executed by a processor with a first register and a second register, cause the processor to execute a hypervisor on a first thread, initialize an application to execute with an updated instruction set architecture, and store a first execution state of the first thread in the first register. The instructions cause the processor to suspend execution of the first thread and execute the application on a second thread, and the application to store a hypercall in a first shared memory location in the memory and a second execution state of the second thread in the second register. The instructions cause the processor to suspend execution of the second thread and resume execution of the first thread in the first execution state, and the hypervisor to retrieve data associated with the hypercall from the first shared memory location and process the data, including storing a result to a second shared memory location. Responsive to completing processing of the data, the instructions cause the processor to suspend execution of the first thread and resume execution of the second thread in the second execution state.

Additional features and advantages of the disclosed methods and system are described in, and will be apparent from, the following Detailed Description and the Figures.

DETAILED DESCRIPTION OF EXAMPLE EMBODIMENTS

Figure 1:
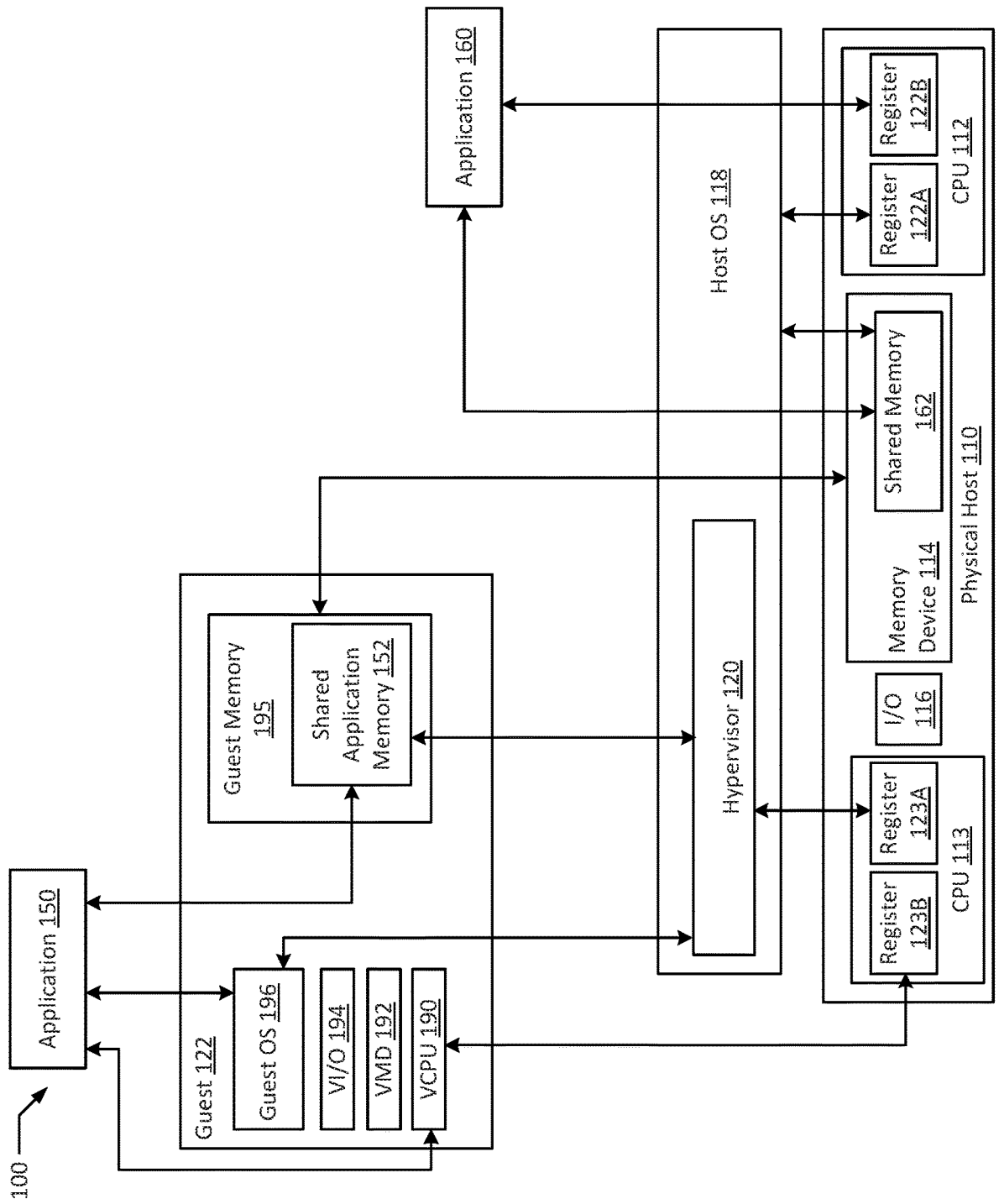
FIG. 1 is a block diagram of an example system for implementing thread execution transition according to an example embodiment of the present disclosure.

Described herein are methods and systems for fast thread execution transition. For example, the systems provided herein may advantageously enable fast hyper-threaded execution privilege mode transition. Hyper-threading technology enables execution of threads in parallel using a single processor. In a processor supporting hyper-threading, a single physical processor may appear as multiple logical processors (e.g., two hyper-threads). While using this hyper-threading technology, the physical processor resources are shared between the two hyper-threads and the architectural state is stored for the two hyper-threads in two different sets of register files, one for each hyper-thread. However, because the central processing unit (CPU) execution engine is shared between multiple hyper-threads, unless one of the hyper-threads is halted, the other hyper-thread typically executes, at best, at half the maximum speed that would be achievable if it were running on the CPU by itself, due to the execution engine conflict.

Generally, virtual machine guests send a notification to a hypervisor when the virtual machine guests forward a request to the hypervisor. In order to process the request, the physical processor, on which the virtual machine guest was running, may switch from a guest mode to a hypervisor mode, causing a virtual machine (VM) exit, which is one of the major sources of virtualization overhead. A mode switch from one execution mode to another (e.g., a thread in guest mode switching to a thread in hypervisor mode) may be referred to as a context switch. Context switches may need to occur when switching between different threads because the different threads or execution contexts may have different privilege levels that require a full state transition. Context switches such as VM exit are a source of significant latency and virtualization overhead. Generally, latency of forwarding requests from virtual machine guests to a hypervisor is one of the biggest challenges in virtualization efficiency. While batching approaches may partially solve the problem by reducing the number of such notifications, this is still typically not effective for a system with demanding workloads, such as a latency sensitive network function virtualization (NFV) system. One way to reduce this latency is using a memory polling technique, where a virtual machine guest stores requests in a guest memory, and a hypervisor repeatedly checks (i.e., polls) the guest memory for new requests and executes the requests.

Unfortunately, this memory polling technique does not work well in a hyper-threading system. For example, a hypervisor scheduler may execute a virtual central processing unit (VCPU) on a hyper-thread of a physical processor and schedule a polling and request executing task on a sibling hyper-thread in the same physical processor. However, this may slow down the VCPU because the sibling hyper-thread is not halted while the other hyper-thread is executing the VCPU, which causes CPU execution engine conflicts. One way to avoid the CPU execution engine conflict is executing the guest on one hyper-thread of a physical processor and scheduling the polling and request executing task on a hyper-thread in a different physical processor. However, this approach may require expensive cache synchronization when updating the guest memory.

Thus, a significant problem for many workloads (e.g., NFV) remains context switch costs. Switching between guest and hypervisor, as well as from application to supervisor, remains computationally expensive because state must be saved and restored at each transition. Accordingly, these high computational costs typically are too much to use a standard supervisor networking stack, for example. Also, this problem forces many uses of technologies such as device assignment as a work around in order to bypass the typical needs for hypercalls and system calls, the context switches of which are too computationally expensive for use in practice (e.g., unacceptable latency in NFV applications).

As a partial fix, symmetric multiprocessing (SMP) guests may execute on multiple threads in a hyper-threaded CPU, with one logical CPU executing guest instructions while another logical CPU would execute a context switch. The CPU can process instructions based on an instruction pointer of any of the files, and the instructions are tracked with an identifier of the logical CPU and affect the specific register files for the appropriate logical CPU. However, since the logical CPUs accordingly share state, running them in parallel presents a security risk of threads on separate hyper-threads leaking information to each other, which may require, at least in some circumstances, the disabling of hyper-threading to avoid the possible security problems associated with these potential leaks. For example, computer systems implementing various different physical processors and executing various operating systems, such as Red Hat® Enterprise Linux® and CentOS®, provide an option to disable of hyper-threading.

The present disclosure addresses the problem of the latency of context switch and the security problems resulting from this latency as discussed above by changing the CPU to only execute one stream of instructions at a time. The instruction set architecture is extended with instructions that switch the current register file. For example, an instruction (e.g., setthread(X)) selects a current register file (e.g., X). A guest and a hypervisor can use this instruction to, in effect, execute a fast hypercall where the hypervisor runs on thread 0 and the guest runs on thread 1, for example. When the hypervisor is running on thread 0, it executes setthread(1), and the guest then executes on thread 1. Then when the guest needs to execute a hypercall, the guest stores data for the hypercall at a known location in memory and executes setthread(0) to switch to register file 0 and enter the hypervisor. The hypervisor reads the data from the known location and performs the hypercall action, stores hypercall data in a known location for the guest, and executes setthread(1) to return to guest. Thus, no actual context switch occurs for this guest to receive the result from the hypercall. Each thread always executes in its own security context, and no parallelism presents security risks (e.g., spectre or related attack) when executing a call (e.g., hypercall, system call). Each thread is used to maintain a separate register file which removes the need to save state and restore state each time the execution switches between privilege modes from hypervisor to guest and vice versa. By removing the saving and restoring of state, the calls are sped up substantially while maintaining the security of a normal context switch.

Thus, the present disclosure effectively provides, in a hyper-threaded CPU, a fast context switch between hyper-threads while maintaining security, which advantageously reduces the practical need to give higher privileges to entities (e.g., VM guests) so that the normally expensive context switches may be avoided. For example, device assignment allows a VM guest to have access to a device through higher privileges than desirable for security purposes, which makes security more difficult to maintain and also breaks VM migration. Additional features and advantages of the disclosed method, system, and apparatus are described below.

FIG. 1 is a block diagram of a system implementing fast thread execution transition according to an example of the present disclosure. The system 100 may include one or more physical host(s) 110. Physical host 110 may in turn include one or more physical processor(s) (e.g., CPUs 112, 113) communicatively coupled to memory device(s) (e.g., MD 114) and input/output device(s) (e.g., I/O 116). As used herein, physical processor or processors 112, 113 refer to devices capable of executing instructions encoding arithmetic, logical, and/or I/O operations. In one illustrative example, a processor may follow a Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In the example, a processor (or a core) may support hyper-threading and appear as multiple logical processors (e.g., two hyper-threads per core), for example, with CPU 112 including registers 122A-B, and CPU 113 including registers 123A-B. In an example, each processor may include more than two logical processors (e.g., three or four hyper-threads). In an example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU")

As discussed herein, memory device 114 refers to volatile or non-volatile memory devices, such as RAM, ROM, EEPROM, flash memory, or any other device capable of storing data. As discussed herein, I/O device(s) 116 refer to devices capable of providing an interface between one or more processor pins and an external device, the operation of which is based on the processor inputting and/or outputting binary data (e.g., storage devices, network devices, keyboards, mice, monitors, etc.). For example, a network interface card may be an example of an I/O device through which physical host 110 and guest 122 hosted on physical host 110 communicates with external systems over a network. CPU (s) 112, 113 may be interconnected using a variety of techniques, ranging from a point-to-point processor interconnect, to a system area network, such as an Ethernet-based network. Local connections within physical host 110, including for example, the connections between processor 112 and a memory device 114 and between processor 112 and I/O device 116, which may be provided by one or more local buses of suitable architecture, for example, peripheral component interconnect (PCI). The memory device 114, which may be referred to as host memory, may include a shared memory 162 that is shared with an application (e.g., application 160). For example, the shared memory 162 may include a plurality of memory locations that are read/write, read only, or the like, which the application 160, as well as other applications, may have access. In an example, access to the shared memory 162 is provided by a host OS 118 that is executing on the physical host 110.

In an example, physical host 110 may host one or more guests, for example, guest 122. In an example, a VM may be a robust simulation of an actual physical computer system utilizing a hypervisor to allocate physical resources to the virtual machine (e.g., Red Hat® Virtualization, Red Hat® KVM hypervisor). A guest may also be a container in a virtualization system such as Red Hat® OpenShift® or Docker®. In an example, guests may be VMs and/or containers, which may host additional nested layers of guests. In an example, guest 122 is an application executing on host OS 118 and hypervisor 120. In and example, the host OS 118 may be Red Hat® Enterprise Linux® and the hypervisor 120 may be a Red Hat® KVM hypervisor which may operates with, for example, Red Hat® Virtualization, OpenStack®, KubeVirt, etc. In an example, application 150 may be another virtual guest nested inside of guest 122. Application 150 may be any form of executable program that executes on guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on physical host 110.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executing on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to guest 122 as devices, including virtual central processing unit ("VCPU") 190, virtual memory devices ("VIVID") 192, virtual input/output ("VI/O") device 194, and/or guest memory 195. The guest memory 195 may be mapped to host memory in the memory device 114, such that when the application 150 accesses the guest memory 195, the application is actually accessing the host memory in memory device 114. The guest memory 195 may include a shared application memory accessible to the hypervisor 120 and the application 150. In an example, the shared application memory may map to a portion of the shared memory 162. In an example, VI/O 194 may be a virtual network interface through which guest 122 communicates with external computing resources (e.g., physical host 110, and other hosts or guests over a network). In an example, a guest 122 may be a virtual machine and may execute a guest operating system 196 which may utilize the underlying VCPU 190, VIVID 192, and VI/O 194. Processor virtualization may be implemented by the hypervisor 120 scheduling time slots on physical processors 112 such that from the guest operating system's perspective those time slots are scheduled on a virtual processor 190.

Guest 122 may run on any type of dependent, independent, compatible, and/or incompatible applications on the underlying hardware and host operating system 118. In an example, a container or application (e.g., application 150) running on guest 122 may be dependent on the underlying hardware and/or host operating system 118. In another example, a container or application (e.g., application 150) running on guest 122 may be independent of the underlying hardware and/or host operating system 118. In an example, a container or application (e.g., application 150) running on guest 122 may be compatible with the underlying hardware and/or host operating system 118. Additionally, a container or application (e.g., application 150) running on guest 122 may be incompatible with the underlying hardware and/or OS. The hypervisor 120 may manage memory for the host operating system 118 as well as memory allocated to the guest 122 and guest operating system 196 such as guest memory 195 provided to guest OS 196.

In an example, application 160 is another executable program that executes directly on host OS 118, with access to network interface card I/O 116 and memory device 114. In an example, application 160 may be a virtual guest (e.g., a container or VM). In another example, application 160 may be any form of network accessible application that receives messages over a network. In an example, application 160's access to a network is controlled by host OS 118 (e.g., by a network driver associated with NIC executing in host OS 118).

In an example, any form of suitable network for enabling communications between computing devices, for example, a public network (e.g., the Internet), a private network (e.g., a local area network (LAN) or wide area network (WAN)), or a combination thereof may be employed to connect physical host 110, guest 122, application 150 and/or 160, and/or to other computer systems.

In an example, a context switch between an unprivileged execution mode (e.g., application 150 or 160) and a privileged execution mode (e.g., hypervisor 120, host OS 118) may potentially create security risks if handled improperly. A component executing in a privileged execution mode may be referred to as a supervisor. For example, a supervisor may be operating system kernel or a hypervisor. In an example, the host OS 118 may include the supervisor. The supervisor may have the ability to change memory mappings for an application, may act as a controller of multiple processes including individual user processes within an application memory space, may perform several tasks such as executing processes and handling interrupts, and may also provide basic services such as memory management, process management, file management, and I/O management. In an example, the supervisor 186 may be part of a kernel.

Figure 2A:
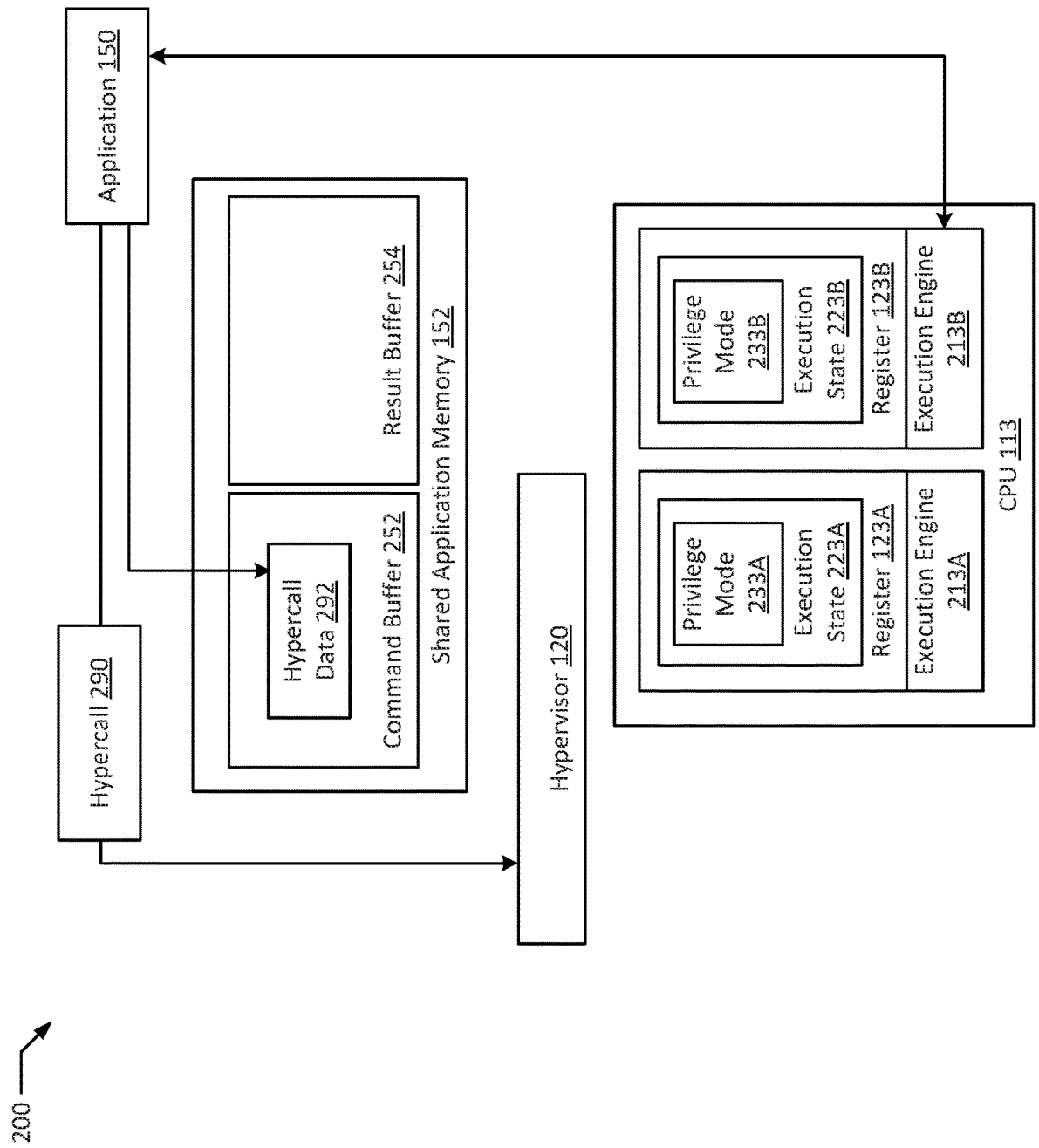
FIGS. 2A, 2B, and 2C are a block diagrams illustrating thread execution transition according to an example embodiment of the present disclosure.
Figure 2B:
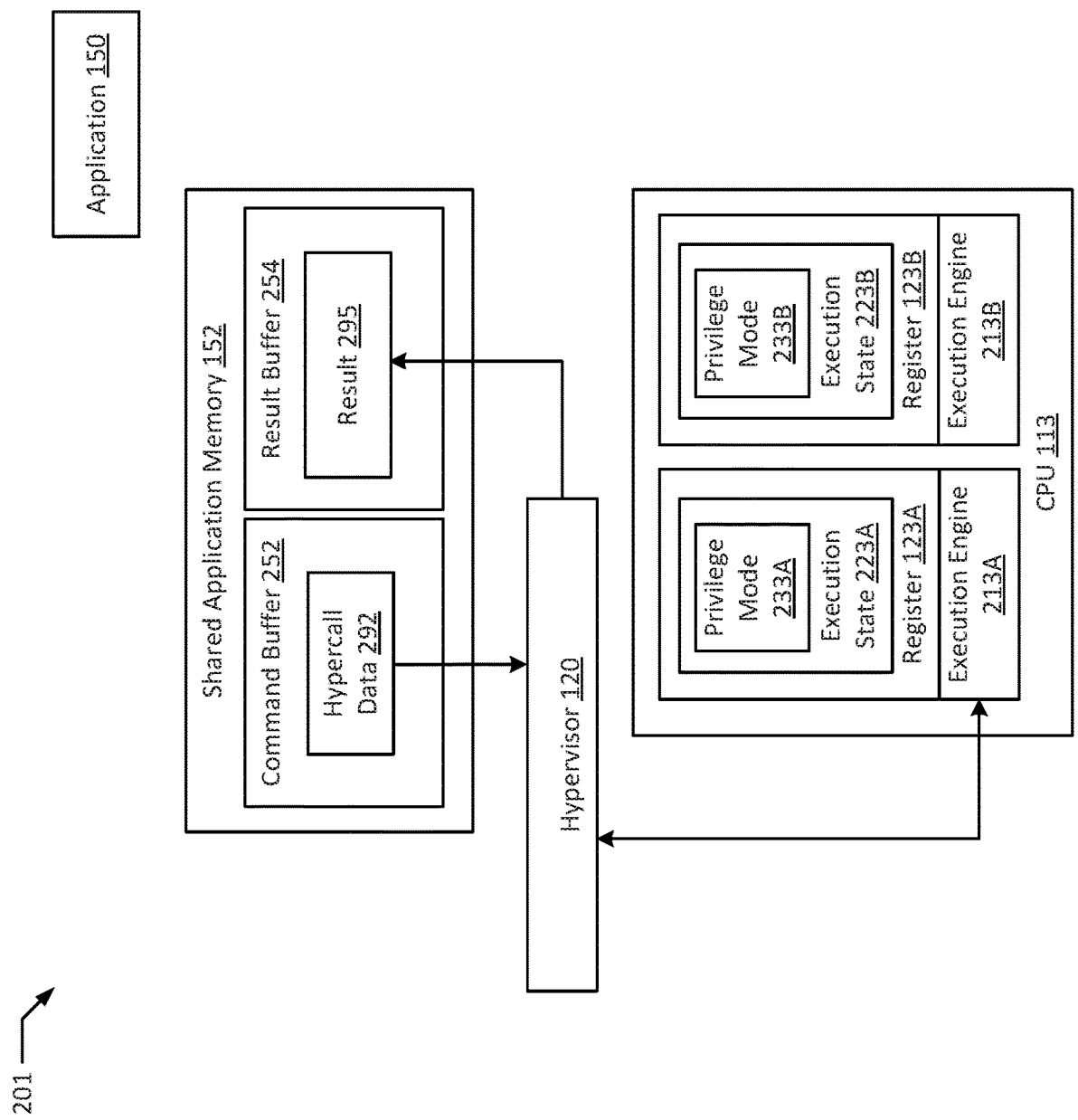
Figure 2C:
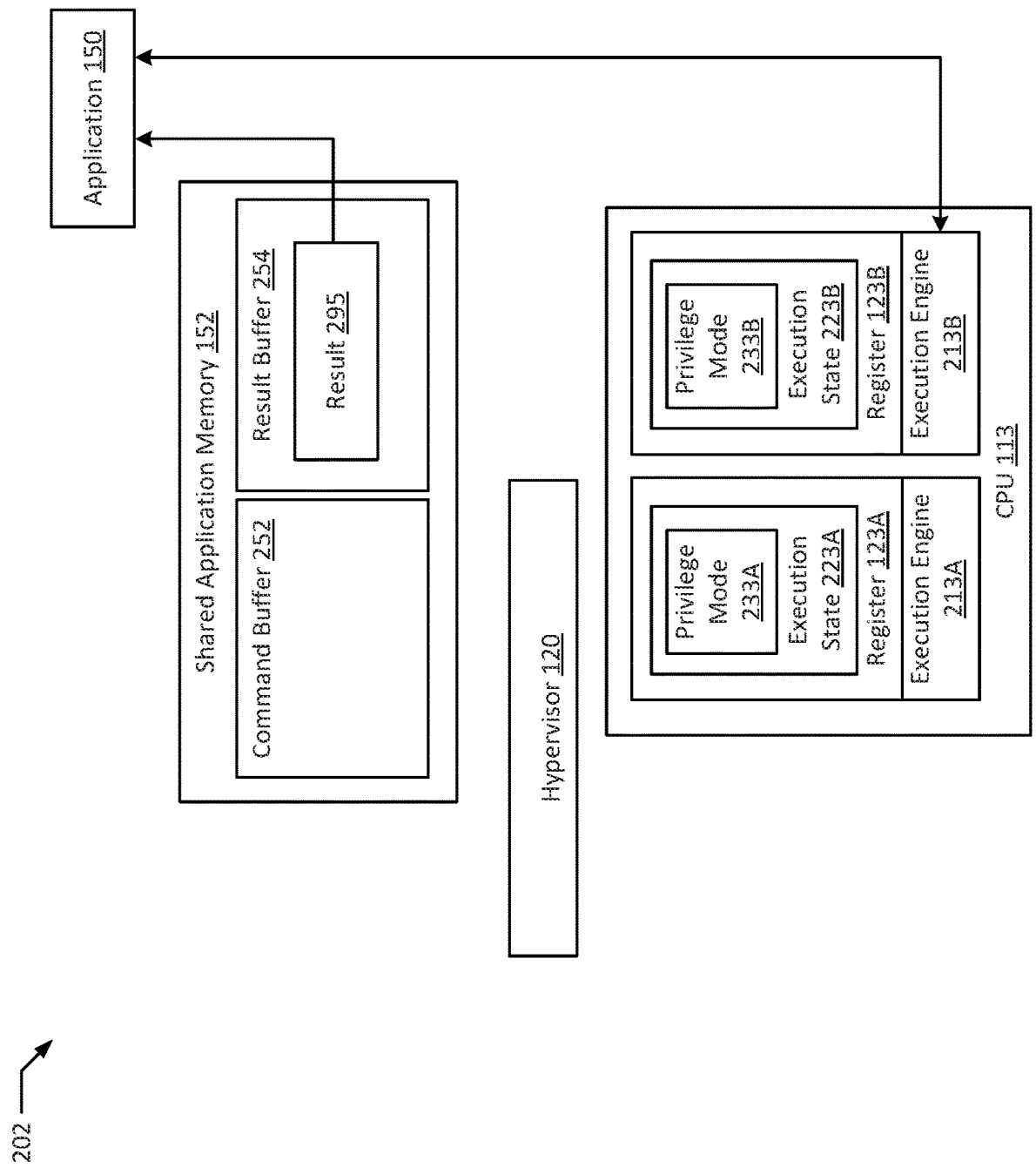

FIGS. 2A-C are block diagrams illustrating a thread execution transition between privilege modes according to an example of the present disclosure. In the illustrated example, system 200 includes a CPU 113 structured to execute two hyper-threads, respectively, on an execution engine 213A with corresponding register 123A, and an execution engine 213B with corresponding register 123B. Only one of execution engine 213A-B can actively execute a stream of instructions at any given time. Each of registers 123A-B maintain a current architectural CPU state for the corresponding respective hyper-thread. For example, register 123A stores a current version of execution state 223A for the first hyper-thread, and register 123A stores a current version of execution state 223A for the second hyper-thread. Each execution state includes a privilege mode. For example, execution state 223A for the first hyper-thread has privilege mode 233A (e.g., privileged mode, kernel mode) and execution state 223B for the second hyper-thread has privilege mode 233B (e.g., application mode, user mode). The system 200 may have an updated instruction set architecture employed by the CPU 113 and execution engines 213A-B. In an example, the hypervisor 120 may be configured to update the instruction set architecture with instructions (e.g., setthread(X)) that switch the current register file.

The application 150 is configured for fast thread execution transition. For example, the hypervisor 120 may configure the application 150 and/or the shared application memory 152 by initializing the application with an extended instruction set and initializing the shared application memory. For example, the shared application memory 152 includes a command buffer 252 and a result buffer 254. Both of the application 150 and the hypervisor 120 have access to the shared application memory 152. In an example, the application 150 may have read/write access to the command buffer 252, but only read access to the result buffer 254.

As illustrated in FIG. 2A, the application 150 is executing on execution engine 213B in privilege mode 233B. When the application 150 needs to execute a hypercall, the application 150 may switch execution from its thread (e.g., a first hyper-thread HT0 on execution engine 213A) to a different thread (e.g., a second hyper-thread HT1 on execution engine 213B) by executing a thread switching instruction such as setthread(0). To perform the switch and have the hypercall handled, the application 150 stores hypercall data 292 in the command buffer 252, and sends a request such as hypercall 290. For example, the hypercall 290 includes the setthread (0) instruction, which changes the current register file from register 123B to register 123A.

Illustrated system 201 in FIG. 2B is a later point in time for system 200. As shown in FIG. 2B, the CPU 113 now executes, on execution engine 213A, the hypervisor 120 associated with the execution state 223A in register 123A. For example, HT1 is suspended, the first execution state 223A stored in the in register 123A remains unchanged while the HT1 is suspended. The hypervisor 120 retrieves the hypercall data 292 from the command buffer 252, processes the data as the hypervisor 120 would normally handle the hypercall 290, and generates a result 295 from processing the data. The hypervisor 120 stores the result 295 in the result buffer 254 for the application 150 to retrieve once the application 150 is executing again. The hypervisor 120 executes setthread(1) to switch the currently executing thread (e.g., HT0) to the other thread (e.g., HT1) so the application 150 can resume execution.

Illustrated system 202 in FIG. 2C is a later point in time for system 201. As illustrated in FIG. 2C, the CPU 113 now executes, on execution engine 213B, the application 150 associated with the execution state 223B in register 123B. For example, HT0 is now suspended and HT1 is resumed.

In an example, the first execution state 223A is updated when the execution of the HT0 is resumed, and the second execution state 223B is updated when the execution of the HT1 is resumed. Once the application 150 has resumed execution, the application 150 retrieves the result 295 stored in the result buffer. Since the thread transition between the threads (e.g., HT1 to HT0 and then HT0 to HT1) did not require the saving of the execution state 223B outside of the register 123B, the loading of the execution state 223A into the same register 123B, and the reverse operations to reload the initial thread's state, the thread transition is faster than a normal context switch, while maintaining security across privilege modes 223A-B.

Figure 3:
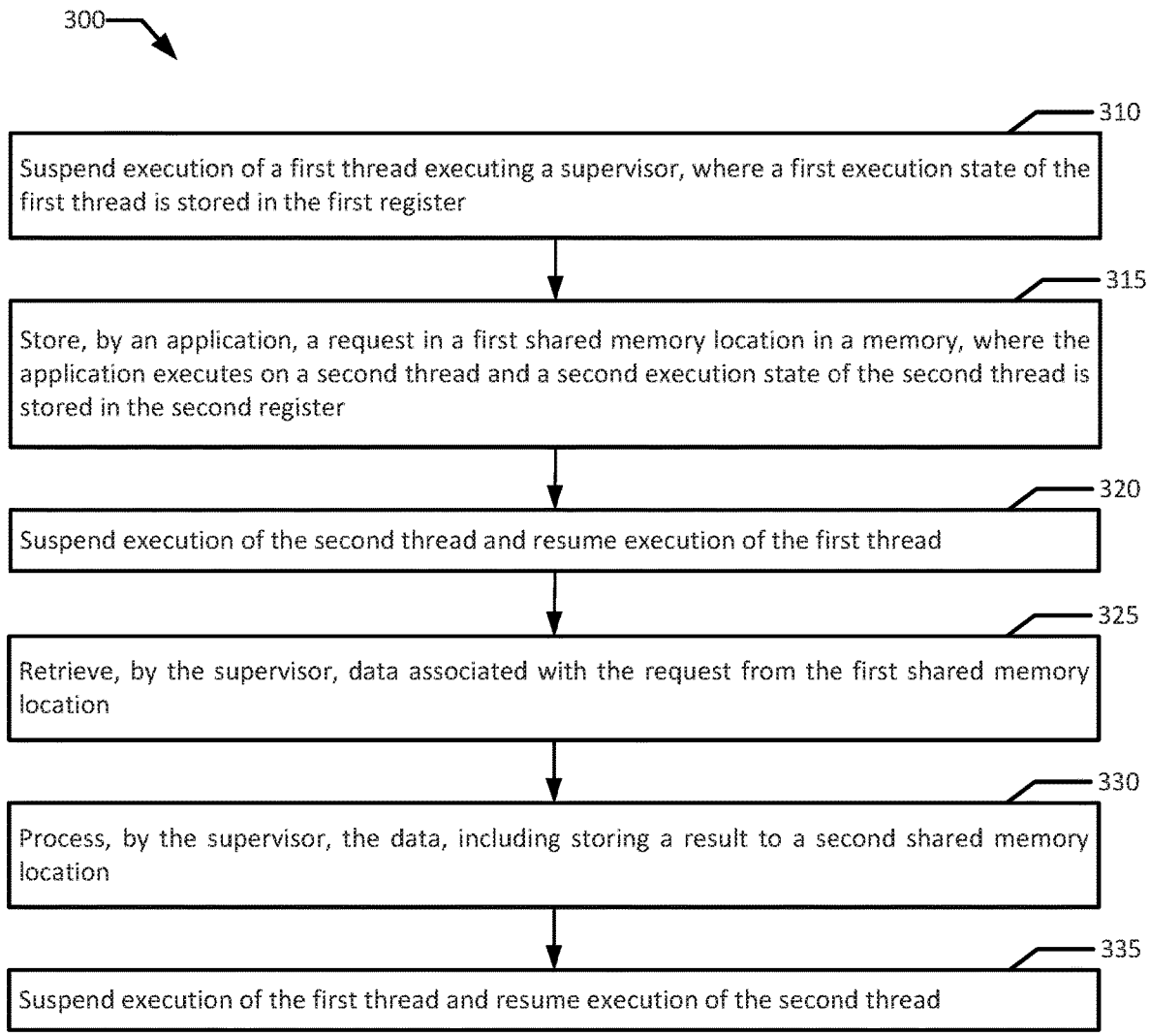
FIG. 3 is a flowchart illustrating an example method for thread execution transition according to an example embodiment of the present disclosure.

FIG. 3 is a flowchart illustrating an example of fast thread execution transition according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by application 150 and hypervisor 120 which may be executing on CPU 113.

The example method 300 may begin with suspending execution of a first thread executing a supervisor, where a first execution state of the first thread is stored in the first register (block 310). For example, a processor (e.g., CPU 113) may suspend execution of a first hyper-thread executing the hypervisor 120, and a first execution state 223A of the first hyper-thread is stored in register 123A which is updated each time the first execution state 223A changes. In an example, the supervisor may be a host OS, a component of a host OS (e.g., kernel), a hypervisor, a guest OS, or the like.

Then, an application stores a request in a first shared memory location in the memory, where the application executes on a second thread and a second execution state of the second thread is stored in the second register (block 315). For example, the application 150 stores a call in the shared application memory 152, which is accessible by the hypervisor 120. For example, the application 150 may store a hypercall 290 and/or hypercall data 292 in the command buffer 252 within the shared application memory 152. The application 150 may be executing on a second hyper-thread which stores a second execution state 223B of the second hyper-thread in register 123B, which is updated each time the second execution state 223B changes. The first register may be configured to be inaccessible by the second thread. For example, the application 150 may be unable to read or write to the register 123A storing the execution state 223B. the In another example, the request may be a system call sent by application 160. In an example, the request may be an instruction and pointer to another memory location.

The method 300 may continue with suspending execution of the second thread and resuming execution of the first thread (block 320). For example, the CPU 113 may suspend the second hyper-thread executing the application 150 and resume execution of the first hyper-thread executing the hypervisor 120. In another example, the CPU 112 may suspend execution of a second hyper-thread executing application 160, and resume execution of a first hyper-thread executing the host OS 118 (e.g., host OS kernel). In an example, switching execution from the first thread to the second thread causes an execution privilege mode transition. In an example, the execution engine 213B prefetches data for a processing task of the application 150 prior to the hypervisor 120 storing the result 295, and the prefetched data is used by the execution engine 213B while processing the processing task.

The supervisor retrieves data associated with the request from the first shared memory location (block 325). For example, the hypervisor 120 retrieves data from the shared application memory 152. In an example, the hypercall data 292 associated with the hypercall 290 is retrieved from the command buffer 252 by the hypervisor 120. In another example, the host OS 118 may retrieve data associated with a system call from shared memory 162.

The supervisor processes the data, including storing a result to a second shared memory location (block 330). For example, the supervisor may execute a call using the data to generate a result (e.g., vie data reads, arithmetic operations, and/or boolean operations), which is then stored for the application to retrieve. In an example, the hypervisor 120 may execute a hypercall 290 using hypercall data 292 to generate a result 295, which is then stored in the result buffer 254. In an example, the second shared memory location may be a hypervisor memory location that is shared with the application 150. For example, this hypervisor memory location may be configured as read only by the application 150. In a typical example, the first shared memory location and the second shared memory location may be different locations in a block of memory (e.g., in shared memory 162). In an alternative example, the first shared memory location and the second shared memory location may be separately located in different sections or non-contiguous blocks of memory. In an example, the first shared memory location and the second shared memory location could be the same location, in which case the result may overwrite the request and/or the data stored in this location. In another example, the host OS 118 may execute a system call to generate a result that is stored in the shared application memory 162 for the application 160. In an example, the supervisor is configured to execute with a level of elevated rights, such as that of a hypervisor or an operating system kernel.

Responsive to completing processing of the data, execution of the first thread is suspended and execution of the second thread is resumed (block 335). For example, For example, the CPU 113 may suspend the first hyper-thread executing the hypervisor 120 and resume execution of the second hyper-thread executing the application 150. In another example, the CPU 112 may suspend execution of the first hyper-thread executing host OS 118 (e.g., host OS kernel), and resume execution of the second hyper-thread executing the application 160. Then, in response to resuming execution of the second thread, the application may retrieve the result 295 from the second shared memory location. For example, the result 295 may be retrieved from the result buffer 254 in the shared application memory 152.

Figure 4:
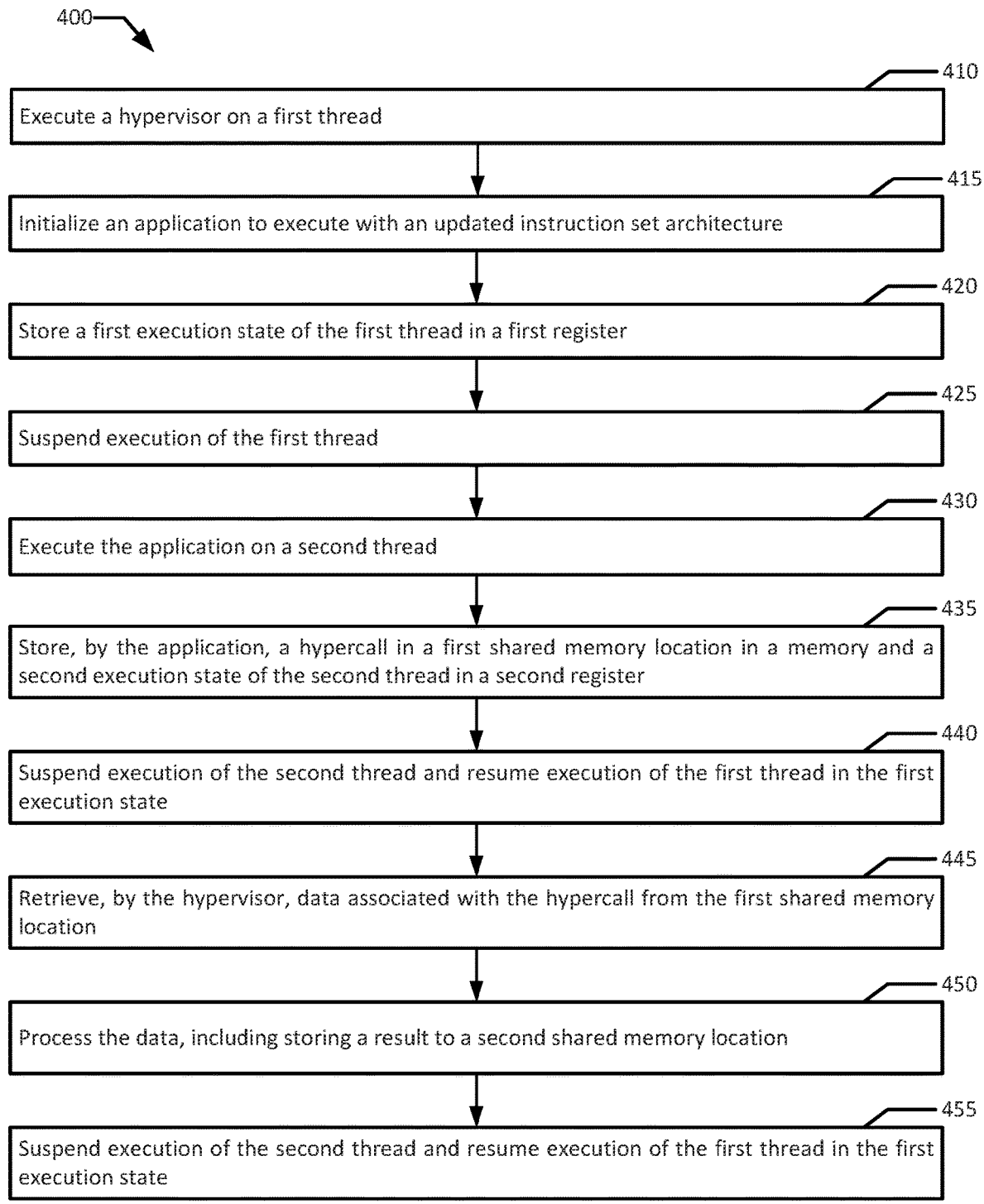
FIG. 4 is a flowchart illustrating an example method for thread execution transition according to an example embodiment of the present disclosure.

FIG. 4 is a flowchart illustrating an example of fast thread execution transition according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. For example, the method is performed on a processor with a first register and a second register.

In example method 400, a hypervisor may execute a first thread (block 410). For example, the hypervisor 120 executes on a first hyper-thread with privilege mode 233A. An application is initialized to execute with an updated instruction set architecture (block 415). For example, application 150 is initialized to include a setthread(X) instruction that causes the CPU 112 to switch the current register file so that the CPU 112 switches from only executing the second hyper-thread with privilege mode 233B to only executing the first hyper-thread with privilege mode 233A. In an example, the hypervisor 120 may have been previously initialized to execute with the updated instruction set architecture, and guests or applications may selectively be initialized based on a user request. For example, the hypervisor 120 may be a Red Hat® KVM hypervisor that operates with, for example, Red Hat® Virtualization, OpenStack®, KubeVirt, etc. In an example, a call name that causes the thread execution to switch may remain the same for backward compatibility, and the application 150 may be extended to write the data (e.g., hypercall data 292) associated with the call in the shared application memory 152. In an example, the hypervisor 120 initializes a shared memory including a first shared memory location (e.g., command buffer 252) and a second shared memory location (e.g., result buffer 254). In an example, the application 150 may need to request initialization from the hypervisor 120 to have access to write the first shared memory location and/or read the second shared memory location.

A first execution state of the first thread is stored in the first register (block 420). For example, the current execution state 223A of the first hyper-thread is stored in register 123A. Execution of the first thread is suspended (block 425). For example, the CPU 113 suspends the execution engine 213A which is executing the hypervisor 120 on the first hyper-thread. Then the application is executed on a second thread (block 430). For example, the execution engine 213B executes the application 150 on the second hyper-thread in privilege mode 233B.

The application stores a hypercall in a first shared memory location in a memory and a second execution state of the second thread in a second register (block 435). For example, the application 150 stores a hypercall 290 (and/or hypercall data 292) in the command buffer 252 in the shared application memory 152 and stores the current execution state 223B of the second hyper-thread is stored in register 123B. In an example, the memory includes the first shared memory location in the command buffer 252, a second shared memory location in the result buffer 254, and a third shared memory location in the command buffer 252. For example, the third shared memory location is accessible by a third thread (e.g., another hyper-thread).

Then, execution of the second thread is suspended and execution of the first thread is resumed in the first execution state (block 440). For example, the CPU 113 suspends the execution engine 213B which is executing the application 150 on second hyper-thread, and the execution engine 213A resumes executing the hypervisor 120 on the first hyper-thread in privilege mode 233A. Switching execution from the second thread to the first thread may cause an execution privilege mode transition from privilege mode 233B (e.g., restricted access) to privilege mode 233A (e.g., elevated rights). In an example, the execution engine 213B prefetches data for a processing task of the application 150 prior to the hypervisor 120 storing the result 295, and the prefetched data is used by the execution engine 213B while processing the processing task.

The hypervisor retrieves data associated with the hypercall from the first shared memory location (block 445). For example, the hypervisor 120 retrieves the hypercall 290 (and/or hypercall data 292) stored in the command buffer 252 in the shared application memory 152. The hypervisor processes the data, including storing a result to a second shared memory location (block 450). For example, the hypervisor 120 stores a result 295 in the result buffer 254 in the shared application memory 152. In an example, the memory includes the first shared memory location in the command buffer 252, a second shared memory location in the result buffer 254, and a third shared memory location in the result buffer 254. For example, the third shared memory location is accessible by a third thread (e.g., another hyperthread).

In response to completing processing of the data, execution of the first thread is suspended and execution of the second thread in the second execution state is resumed (block 455). For example, the CPU 113 suspends the execution engine 213A which is executing the hypervisor 120 on first hyper-thread, and the execution engine 213B resumes executing the application 150 on the second hyper-thread in privilege mode 233B. Switching execution from the first thread to the second thread may cause an execution privilege mode transition from privilege mode 233A (e.g., elevated rights) to privilege mode 233B (e.g., restricted access). Then, in response to resuming execution of the second thread, the application 150 may retrieve the result 295 from the second shared memory location. For example, the result 295 may be retrieved from the result buffer 254 in the shared application memory 152.

Figure 5:
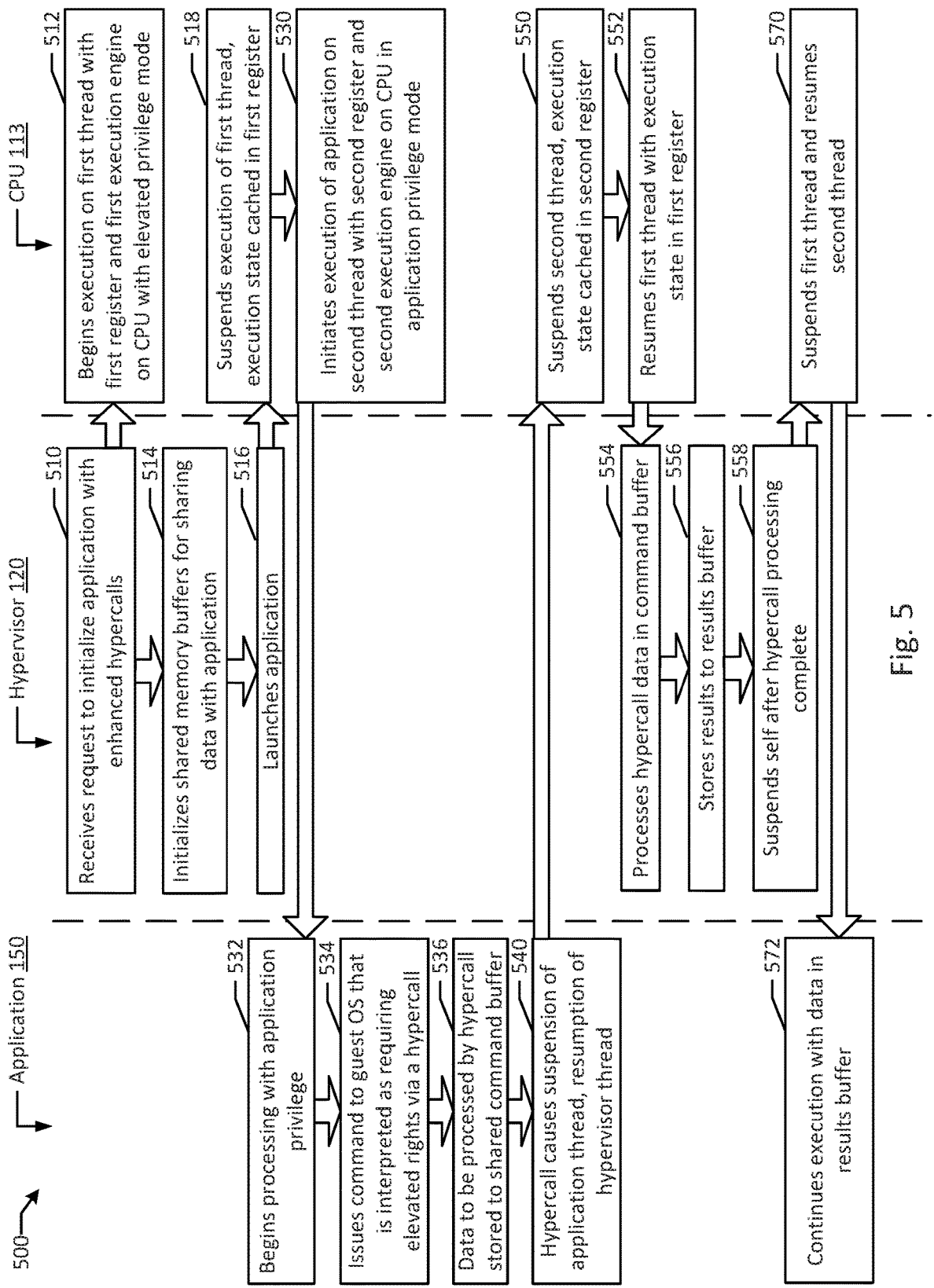
FIG. 5 is a flow diagram illustrating an example process for thread execution transition according to an example embodiment of the present disclosure.

FIG. 5 illustrates a flow diagram of an example method 500 for fast thread execution transition according to an example embodiment of the present disclosure. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both. For example, the method 500 may be performed by a system including CPU 113, hypervisor 120, and application 150 communicating or interacting with each other.

The example method 500 may begin with the hypervisor 120 receiving a request to initialize an application 150 with enhanced hypercalls (block 510). The CPU 113 begins execution on a first thread, with a first register and a first execution engine on CPU 113 with an elevated privilege mode (block 512). Then the hypervisor 120 initializes shared memory buffers for sharing data with application 150 (block 514). For example, the hypervisor 120 may initialize a shared memory application memory 152 in guest memory 195. The shared memory application memory 152 is accessible to the hypervisor 120 and the application 150. The shared memory application memory 152 may include a command buffer 252 and a result buffer 254. Next, the hypervisor 120 launches the application 150 (block 516). The CPU 113 suspends execution of the first thread, and the execution state cached in the first register (block 518).

The CPU 113 initiates execution of application 150 on a second thread, with a second register and a second execution engine on CPU 113 in an application privilege mode (block 530). Then the application 150 begins processing with application privileges (block 532). The application 150 issues a command to a guest OS that is interpreted as requiring elevated rights via a hypercall (block 534). Data to be processed by a hypercall is then stored by the application 150 in a command buffer (block 536). Then the hypercall causes suspension of the first thread or application thread and resumption of the second thread or hypervisor thread (block 540). For example, these threads are two hyperthreads of a single processor core in CPU 113. In an example, the hypercall may be included in a setthread(X) type instruction which may enable backward compatibility. In an example, the application 150 executes setthread(0) to switch threads after hypercall data is stored in the command buffer.

The CPU 113 suspends the second thread and the execution state is cached in the second register (block 550). In an example, the execution engine 213B prefetches data for a processing task of the application 150 prior to the hypervisor 120 storing the result 295, and the prefetched data is used by the execution engine 213B while processing the processing task. Also, the CPU 113 resumes the first thread with the execution state that is stored in the first register (block 552). Then the hypervisor 120 processes hypercall data in the command buffer (block 554). For example, the hypercall data may include the hypercall name and various operands to be processed. The hypervisor 120 then stores results to a results buffer (block 556). The hypervisor 120 suspends itself after the hypercall processing complete (block 558). For example, the hypervisor 120 executes setthread(1) to switch threads. To switch threads, the CPU 113 suspends the first thread and resumes the second thread (block 570). Then the application 150 continues execution with the data stored in the results buffer (block 572).

Figure 6:
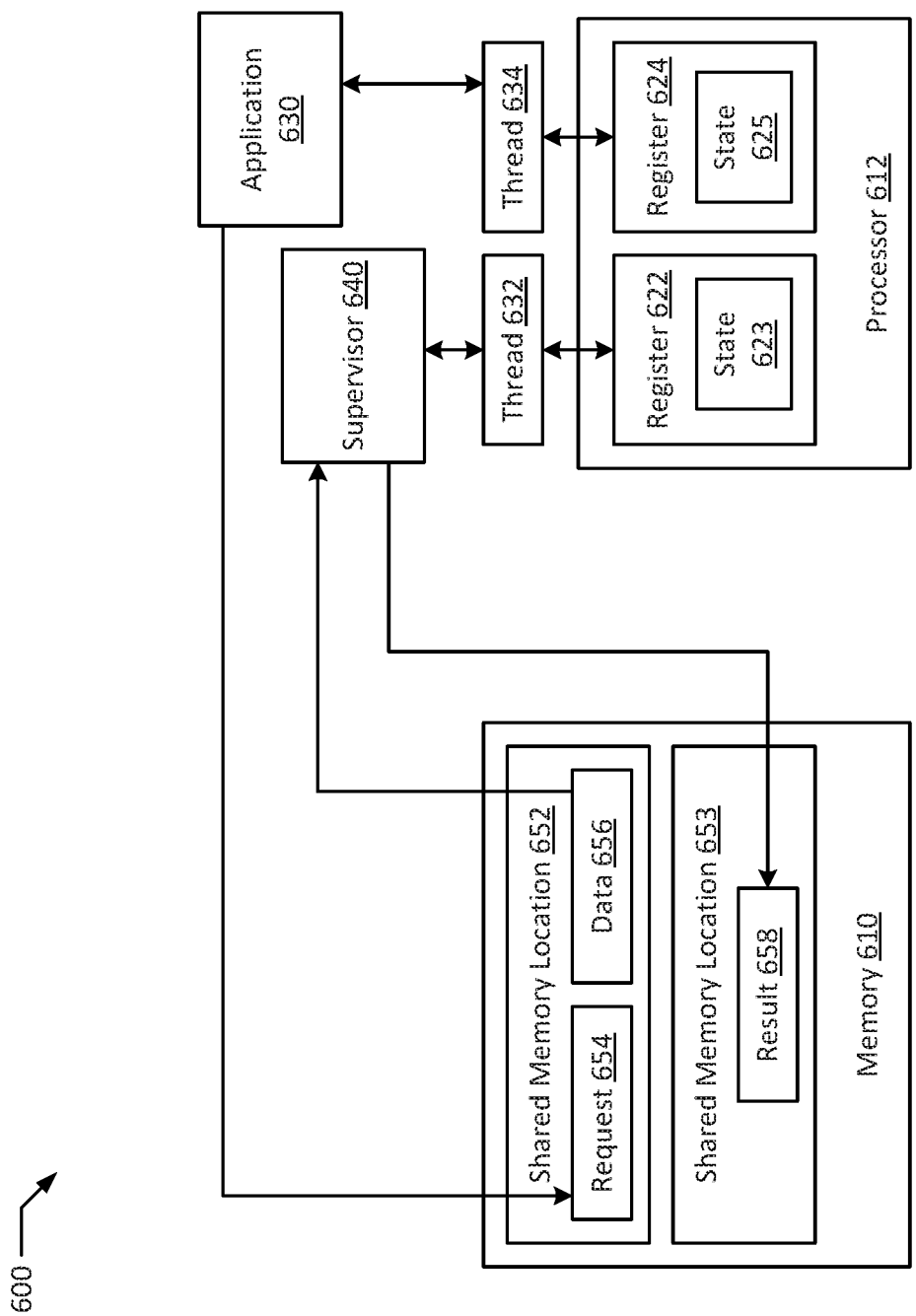
FIG. 6 is a block diagram of an example thread execution transition system according to an example embodiment of the present disclosure.

FIG. 6 is a block diagram of a fast thread execution transition system 600 according to an example of the present disclosure. System 600 includes a memory 610 and a processor 612 with a register 622 and a register 624. An application 630 and a supervisor 640 are configured to execute on the processor 612 to suspend execution of a thread 632 executing the supervisor 640. An execution state 623 of the thread 632 is stored in the register 622. The application 630 stores a request 654 in a shared memory location 652 in the memory 610. The application 630 executes on a thread 634 and an execution state 625 of the thread 634 is stored in the register 624. Then, execution of the thread 634 is suspended and execution of the thread 632 is resumed. The supervisor 640 retrieves data 656 associated with the request 654 from the shared memory location 652. The supervisor 640 processes the data 656, including storing a result 658 to a shared memory location 653. Responsive to the supervisor 640 completing processing of the data 656, execution of the thread 632 is suspended and execution of the thread 634 is resumed. Then, for example, the application 630 may advantageously retrieve the result 658 without a high latency context switch or unwanted security risks as discussed above.

The presently disclosed system may advantageously be backward compatible with prior systems. For example, in a prior art system, when a call (e.g., hypercall, system call) is sent by an application, the call may be handled in the normal way that invokes a context switch (e.g., a VM exit or an interrupt). Thus, an application that is configured to use the presently disclosed method may operate in the presently disclosed system as well as on a prior art system, so sending a hypercall that would trigger a write to privileged memory may set quickly transition the execution threads as described herein without sacrificing security, or otherwise cause a slower context switch (e.g., VM exit) in a prior art system while maintaining security, but will not break the hypercall functionality in the slower prior art system. Specifically, the system allows the register file of a thread that is resuming execution to not be overwritten with the state the resuming thread as occurs in normal context switch.

Aspects of the subject matter described herein may be useful alone or in combination with one or more other aspects described herein. In a 1st exemplary aspect of the present disclosure, a system comprises: a memory; a processor with a first register and a second register; and an application and a supervisor configured to execute on the processor to: suspend execution of a first thread executing the supervisor, wherein a first execution state of the first thread is stored in the first register; store, by the application, a request in a first shared memory location in the memory, wherein the application executes on a second thread and a second execution state of the second thread is stored in the second register; suspend execution of the second thread and resume execution of the first thread; retrieve, by the supervisor, data associated with the request from the first shared memory location; process, by the supervisor, the data, including storing a result to a second shared memory location; and responsive to completing processing of the data, suspend execution of the first thread and resume execution of the second thread. In accordance with a 2nd exemplary aspect of the present disclosure, which may be used in combination with any one or more of other aspects described herein (e.g., the 1st aspect), responsive to resuming execution of the second thread, the application is configured to retrieve the result from the second shared memory location. In accordance with a 3rd exemplary aspect of the present disclosure, which may be used in combination with any one or more of other aspects described herein (e.g., the 1st aspect), the supervisor is at least one of an operating system kernel and a hypervisor. In accordance with a 4th exemplary aspect of the present disclosure, which may be used in combination with any one or more of other aspects described herein (e.g., the 1st aspect), the request is one of a system call and a hypercall.

In accordance with a 5th exemplary aspect of the present disclosure, which may be used in combination with any one or more of other aspects described herein (e.g., the 1st aspect), the second shared memory location is a hypervisor memory location shared with the application. In accordance with a 6th exemplary aspect of the present disclosure, which may be used in combination with any one or more of other aspects described herein (e.g., the 5th aspect), the second shared memory location is configured as read only by the application. In accordance with a 7th exemplary aspect of the present disclosure, which may be used in combination with any one or more of other aspects described herein (e.g., the 1st aspect), the supervisor is configured to execute with a first level of elevated rights.

In accordance with a 8th exemplary aspect of the present disclosure, which may be used in combination with any one or more of other aspects described herein (e.g., the 1st aspect), switching execution from the first thread to the second thread causes an execution privilege mode transition. In accordance with a 9th exemplary aspect of the present disclosure, which may be used in combination with any one or more of other aspects described herein (e.g., the 1st aspect), the first register is configured to be inaccessible by the second thread. In accordance with a 10th exemplary aspect of the present disclosure, which may be used in combination with any one or more of other aspects described herein (e.g., the 1st aspect), the first execution state stored in the first register remains unchanged while the first thread is suspended. In accordance with an 11th exemplary aspect of the present disclosure, which may be used in combination with any one or more of other aspects described herein (e.g., the 10th aspect), the first execution state is updated when the execution of the first thread is resumed and the second execution state is updated when the execution of the second thread is resumed.

In accordance with a 12th exemplary aspect of the present disclosure, which may be used in combination with any one or more of other aspects described herein (e.g., the 1st aspect), the processor has a first execution engine associated with the first register and a second execution engine associated with the second register, the first execution engine is configured to execute the first thread, and the second execution engine is configured to execute the second thread. In accordance with a 13th exemplary aspect of the present disclosure, which may be used in combination with any one or more of other aspects described herein (e.g., the 12th aspect), the second execution engine prefetches data for a processing task of the application prior to the supervisor storing the result, and the prefetched data is used by the second execution engine while processing the processing task.

In accordance with a 14th exemplary aspect of the present disclosure, which may be used in combination with any one or more of other aspects described herein (e.g., the 1st aspect), a method comprises: suspending execution of a first thread executing a supervisor, wherein a first execution state of the first thread is stored in a first register of a processor; storing, by an application, a request in a first shared memory location in a memory, wherein the application executes on a second thread and a second execution state of the second thread is stored in a second register of the processor; suspending execution of the second thread and resuming execution of the first thread; retrieving, by the supervisor, data associated with the request from the first shared memory location; processing, by the supervisor, the data, including storing a result to a second shared memory location; and responsive to completing processing of the data, suspend execution of the first thread and resume execution of the second thread. In accordance with a 15th exemplary aspect of the present disclosure, which may be used in combination with any one or more of other aspects described herein (e.g., the 14th aspect), the method further comprises responsive to resuming execution of the second thread, retrieving, by the application, the result from the second shared memory location. In accordance with a 16th exemplary aspect of the present disclosure, which may be used in combination with any one or more of other aspects described herein (e.g., the 14th aspect), the supervisor is a hypervisor and the request is a hypercall. In accordance with a 17th exemplary aspect of the present disclosure, which may be used in combination with any one or more of other aspects described herein (e.g., the 14th aspect), the supervisor is an operating system kernel and the request is a system call. In accordance with an 18th exemplary aspect of the present disclosure, which may be used in combination with any one or more of other aspects described herein (e.g., the 14th aspect), the second shared memory location is a hypervisor memory location shared with the application. In accordance with a 19th exemplary aspect of the present disclosure, which may be used in combination with any one or more of other aspects described herein (e.g., the 18th aspect), the second shared memory location is configured as read only by the application. In accordance with a 20th exemplary aspect of the present disclosure, which may be used in combination with any one or more of other aspects described herein (e.g., the 14th aspect), the method further comprises executing, by the supervisor, with a first level of elevated rights.

In accordance with a 21st exemplary aspect of the present disclosure, which may be used in combination with any one or more of other aspects described herein (e.g., the 14th aspect), switching execution from the first thread to the second thread causes an execution privilege mode transition. In accordance with a 22nd exemplary aspect of the present disclosure, which may be used in combination with any one or more of other aspects described herein (e.g., the 14th aspect), the first register is configured to be inaccessible by the second thread. In accordance with a 23rd exemplary aspect of the present disclosure, which may be used in combination with any one or more of other aspects described herein (e.g., the 14th aspect), the first execution state stored in the first register remains unchanged while the first thread is suspended. In accordance with a 24th exemplary aspect of the present disclosure, which may be used in combination with any one or more of other aspects described herein (e.g., the 23rd aspect), the method further comprises updating the first execution state when the execution of the first thread is resumed; and updating the second execution state when the execution of the second thread is resumed.

In accordance with a 25th exemplary aspect of the present disclosure, which may be used in combination with any one or more of other aspects described herein (e.g., the 14th aspect), a first execution engine is associated with the first register and a second execution engine is associated with the second register, and the method further comprises executing, by the first execution engine, the first thread; and executing, by the second execution engine, the second thread. In accordance with a 26th exemplary aspect of the present disclosure, which may be used in combination with any one or more of other aspects described herein (e.g., the 25th aspect), the method further comprises prefetching, by the second execution engine, data for a processing task of the application prior to the supervisor storing the result, wherein the prefetched data is used by the second execution engine while processing the processing task.

In accordance with a 27th exemplary aspect of the present disclosure, which may be used in combination with any one or more of other aspects described herein (e.g., the 14th aspect), the method further comprises initializing a shared memory including the first shared memory location and the second shared memory location. In accordance with a 28th exemplary aspect of the present disclosure, which may be used in combination with any one or more of other aspects described herein (e.g., the 27th aspect), the shared memory includes a command buffer including the first shared memory location. In accordance with a 29th exemplary aspect of the present disclosure, which may be used in combination with any one or more of other aspects described herein (e.g., the 28th aspect), the command buffer includes at least a third shared memory location. In accordance with a 30th exemplary aspect of the present disclosure, which may be used in combination with any one or more of other aspects described herein (e.g., the 29th aspect), the third shared memory location is accessible by a third thread. In accordance with a 31st exemplary aspect of the present disclosure, which may be used in combination with any one or more of other aspects described herein (e.g., the 27th aspect), the shared memory includes a result buffer including the second shared memory location. In accordance with a 32nd exemplary aspect of the present disclosure, which may be used in combination with any one or more of other aspects described herein (e.g., the 31st aspect), the result buffer includes at least a third shared memory location. In accordance with a 33rd exemplary aspect of the present disclosure, which may be used in combination with any one or more of other aspects described herein (e.g., the 32nd aspect), the third shared memory location is accessible by a third thread.

In accordance with a 34th exemplary aspect of the present disclosure, which may be used in combination with any one or more of other aspects described herein (e.g., the 1st aspect), a non-transitory computer readable medium stores instructions which, when executed by a processor with a first register and a second register, cause the processor to: suspend execution of a first thread executing a supervisor, wherein a first execution state of the first thread is stored in the first register; store, by an application, a request in a first shared memory location in a memory, wherein the application executes on a second thread and a second execution state of the second thread is stored in the second register; suspend execution of the second thread and resume execution of the first thread; retrieve, by the supervisor, data associated with the request from the first shared memory location; process, by the supervisor, the data, including storing a result to a second shared memory location; and responsive to completing processing of the data, suspend execution of the first thread and resume execution of the second thread.

In accordance with a 35th exemplary aspect of the present disclosure, which may be used in combination with any one or more of other aspects described herein (e.g., the 14th aspect), a system comprises: a means for suspending execution of a first thread executing a supervisor, wherein a first execution state of the first thread is stored in a first register of a processor; a means for storing, by an application, a request in a first shared memory location in a memory, wherein the application executes on a second thread and a second execution state of the second thread is stored in a second register of the processor; a means for suspending execution of the second thread and resuming execution of the first thread; a means for retrieving, by the supervisor, data associated with the request from the first shared memory location; a means for processing, by the supervisor, the data, including storing a result to a second shared memory location; and a means for suspending execution of the first thread and resuming execution of the second thread.

In accordance with a 36th exemplary aspect of the present disclosure, which may be used in combination with any one or more of other aspects described herein (e.g., the 1st aspect), a non-transitory computer readable medium stores instructions which, when executed by a processor with a first register and a second register, cause the processor to: execute a hypervisor on a first thread; initialize an application to execute with an updated instruction set architecture; store a first execution state of the first thread in the first register; suspend execution of the first thread; execute the application on a second thread; store, by the application, a hypercall in a first shared memory location in a memory and a second execution state of the second thread in the second register; suspend execution of the second thread and resume execution of the first thread in the first execution state; retrieve, by the hypervisor, data associated with the hypercall from the first shared memory location; process, by the hypervisor, the data, including storing a result to a second shared memory location; and responsive to completing processing of the data, suspend execution of the first thread and resume execution of the second thread in the second execution state. In accordance with a 37th exemplary aspect of the present disclosure, which may be used in combination with any one or more of other aspects described herein (e.g., the 36th aspect), responsive to resuming execution of the second thread, the application retrieves the result from the second shared memory location.

In accordance with a 38th exemplary aspect of the present disclosure, which may be used in combination with any one or more of other aspects described herein (e.g., the 36th aspect), the hypervisor initializes shared memory including the first shared memory location and the second shared memory location. In accordance with a 39th exemplary aspect of the present disclosure, which may be used in combination with any one or more of other aspects described herein (e.g., the 36th aspect), the shared memory includes a command buffer including the first shared memory location. In accordance with a 40th exemplary aspect of the present disclosure, which may be used in combination with any one or more of other aspects described herein (e.g., the 39th aspect), the command buffer includes at least a third shared memory location. In accordance with a 41st exemplary aspect of the present disclosure, which may be used in combination with any one or more of other aspects described herein (e.g., the 40th aspect), the third shared memory location is accessible by a third thread. In accordance with a 42nd exemplary aspect of the present disclosure, which may be used in combination with any one or more of other aspects described herein (e.g., the 36th aspect), the shared memory includes a result buffer including the second shared memory location. In accordance with a 43th exemplary aspect of the present disclosure, which may be used in combination with any one or more of other aspects described herein (e.g., the 42nd aspect), the result buffer includes at least a third shared memory location. In accordance with a 44th exemplary aspect of the present disclosure, which may be used in combination with any one or more of other aspects described herein (e.g., the 43rd aspect), the third shared memory location is accessible by a third thread.

In accordance with a 45th exemplary aspect of the present disclosure, which may be used in combination with any one or more of other aspects described herein (e.g., the 36th aspect), a system comprises: a memory; and a processor with a first register and a second register, wherein the processor is configured to: execute a hypervisor on a first thread; initialize an application to execute with an updated instruction set architecture; store a first execution state of the first thread in the first register; suspend execution of the first thread; execute the application on a second thread; store, by the application, a hypercall in a first shared memory location in the memory and a second execution state of the second thread in the second register; suspend execution of the second thread and resume execution of the first thread in the first execution state; retrieve, by the hypervisor, data associated with the hypercall from the first shared memory location; process, by the hypervisor, the data, including storing a result to a second shared memory location; and responsive to completing processing of the data, suspend execution of the first thread and resume execution of the second thread in the second execution state.

In accordance with a 46th exemplary aspect of the present disclosure, which may be used in combination with any one or more of other aspects described herein (e.g., the 36th aspect), a method comprises: executing a hypervisor on a first thread; initializing an application to execute with an updated instruction set architecture; storing a first execution state of the first thread in a first register; suspending execution of the first thread; executing the application on a second thread; storing, by the application, a hypercall in a first shared memory location in a memory and a second execution state of the second thread in a second register; suspending execution of the second thread and resuming execution of the first thread in the first execution state; retrieving, by the hypervisor, data associated with the hypercall from the first shared memory location; processing, by the hypervisor, the data, including storing a result to a second shared memory location; and responsive to completing processing of the data, suspending execution of the first thread and resuming execution of the second thread in the second execution state.

In accordance with a 47th exemplary aspect of the present disclosure, which may be used in combination with any one or more of other aspects described herein (e.g., the 46th aspect), a system comprises: a means for executing a hypervisor on a first thread; a means for initializing an application to execute with an updated instruction set architecture; a means for storing a first execution state of the first thread in a first register; a means for suspending execution of the first thread; a means for executing the application on a second thread; a means for storing, by the application, a hypercall in a first shared memory location in a memory and a second execution state of the second thread in a second register; a means for suspending execution of the second thread and resuming execution of the first thread in the first execution state; a means for retrieving, by the hypervisor, data associated with the hypercall from the first shared memory location; a means for processing, by the hypervisor, the data, including storing a result to a second shared memory location; and a means for suspending execution of the first thread and resuming execution of the second thread in the second execution state.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;

a processor with a first register and a second register; and
an application and a supervisor executed on the processor to:
suspend execution of a first thread executing the supervisor, wherein a first execution state of the first thread is stored in the first register;
store, by the application, a request in a first shared memory location in the memory, wherein the application executes on a second thread and a second execution state of the second thread is stored in the second register;
suspend execution of the second thread and resume execution of the first thread;
retrieve, by the supervisor, data associated with the request from the first shared memory location;
process, by the supervisor, the data, including storing a result to a second shared memory location; and
responsive to completing processing of the data, suspend execution of the first thread and resume execution of the second thread,
wherein the processor has a first execution engine associated with the first register and a second execution engine associated with the second register, the first execution engine executes the first thread, and the second execution engine executes the second thread, and
wherein the second execution engine prefetches data for a processing task of the application prior to the supervisor storing the result, and the prefetched data is used by the second execution engine while processing the processing task.

2. The system of claim 1, wherein responsive to resuming execution of the second thread, the application retrieves the result from the second shared memory location.

3. The system of claim 1, wherein the supervisor is at least one of an operating system kernel and a hypervisor.

4. The system of claim 1, wherein the request is one of a system call and a hypercall.

5. The system of claim 1, wherein the second shared memory location is a hypervisor memory location shared with the application.

6. The system of claim 5, wherein the second shared memory location is configured as read only by the application.

7. The system of claim 1, wherein the supervisor executes with a first level of elevated rights.

8. The system of claim 1, wherein switching execution from the first thread to the second thread causes an execution privilege mode transition.

9. The system of claim 1, wherein the first register is inaccessible by the second thread.

10. The system of claim 1, wherein the first execution state stored in the first register remains unchanged while the first thread is suspended.

11. The system of claim 10, wherein the first execution state is updated when the execution of the first thread is resumed and the second execution state is updated when the execution of the second thread is resumed.

12. A method comprising:
suspending execution of a first thread executing a supervisor, wherein a first execution state of the first thread is stored in a first register of a processor;
storing, by an application, a request in a first shared memory location in a memory, wherein the application executes on a second thread and a second execution state of the second thread is stored in a second register of the processor;
suspending execution of the second thread and resuming execution of the first thread;
retrieving, by the supervisor, data associated with the request from the first shared memory location;
processing, by the supervisor, the data, including storing a result to a second shared memory location; and
responsive to completing processing of the data, suspending execution of the first thread and resuming execution of the second thread,
wherein the processor has a first execution engine associated with the first register and a second execution engine associated with the second register, the first execution engine executes the first thread, and the second execution engine executes the second thread, and
wherein the second execution engine prefetches data for a processing task of the application prior to the supervisor storing the result, and the prefetched data is used by the second execution engine while processing the processing task.

13. A non-transitory computer readable medium storing instructions which, when executed by a processor with a first register and a second register, cause the processor to:
execute a hypervisor on a first thread;
initialize an application to execute with an updated instruction set architecture,
store a first execution state of the first thread in the first register;
suspend execution of the first thread;
execute the application on a second thread;
store, by the application, a hypercall in a first shared memory location in a memory and a second execution state of the second thread in the second register;
suspend execution of the second thread and resume execution of the first thread in the first execution state;
retrieve, by the hypervisor, data associated with the hypercall from the first shared memory location;
process, by the hypervisor, the data including storing a result to a second shared memory location; and
responsive to completing processing of the data, suspend execution of the first thread and resume execution of the second thread in the second execution state,
wherein the processor has a first execution engine associated with the first register and a second execution engine associated with the second register, the first execution engine executes the first thread, and the second execution engine executes the second thread, and
Wherein the second execution engine prefetches data for a processing task of the application prior to the hypervisor storing the result, and the prefetched data is used by the second execution engine while processing the processing task.

14. The non-transitory computer readable medium of claim 13, wherein responsive to resuming execution of the second thread, the application retrieves the result from the second shared memory location.

15. The non-transitory computer readable medium of claim 13, Wherein the hypervisor initializes shared memory including the first shared memory location and the second shared memory location.

16. The non-transitory computer readable medium of claim 13, wherein the shared memory includes a command buffer including the first shared memory location.

17. The non-transitory computer readable medium of claim 16, wherein the command buffer includes at least a third shared memory location.

18. The non-transitory computer readable medium of claim 17, wherein the third shared memory location is accessible by a third thread.

\* \* \* \* \*